United States Patent
Takahiro et al.

(10) Patent No.: US 6,942,220 B2
(45) Date of Patent: Sep. 13, 2005

(54) COMBINATION METAL GASKET AND SEAL STRUCTURE

(75) Inventors: Kenichi Takahiro, Hamamatsu (JP); Hideaki Mori, Hamamatsu (JP); Kanji Hanashima, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 10/750,817

(22) Filed: Jan. 5, 2004

(65) Prior Publication Data

US 2004/0183262 A1 Sep. 23, 2004

(30) Foreign Application Priority Data

Jan. 15, 2003  (JP) .................................... 2003-006836

(51) Int. Cl.[7] .............................. F16L 21/05; F16J 15/02
(52) U.S. Cl. .................. 277/603; 277/606; 277/608; 277/644; 285/364
(58) Field of Search .............................. 277/626–627, 277/603, 606, 609, 630, 639, 644, 647, 650; 285/364, 368

(56) References Cited

U.S. PATENT DOCUMENTS

| | | | | |
|---|---|---|---|---|
| 3,192,690 A | * | 7/1965 | Taylor ....................... 220/378 |
| 3,285,632 A | * | 11/1966 | Dunkle ....................... 285/363 |
| 3,797,836 A | * | 3/1974 | Halling ....................... 285/367 |
| 4,254,839 A | * | 3/1981 | Schpok et al. ............... 175/372 |
| 4,582,330 A | * | 4/1986 | Lew et al. ................... 277/587 |
| 5,433,456 A | * | 7/1995 | Nicholson ................... 277/644 |
| 6,565,097 B2 | * | 5/2003 | Jinno ......................... 277/592 |

FOREIGN PATENT DOCUMENTS

| DE | 4305974 C1 | * | 5/1994 | ............ F16J/15/08 |
|---|---|---|---|---|
| JP | 8-145183 | | 6/1996 | |
| JP | 2002-5290 | | 1/2002 | |

* cited by examiner

*Primary Examiner*—Alison Pickard
*Assistant Examiner*—Vishal Patel
(74) *Attorney, Agent, or Firm*—Oblon, Spivak, McClelland, Maier & Neustadt, P.C.

(57) ABSTRACT

The present invention provides a combination metal gasket that is formed by fitting a ring-shaped metal base elastic structure in at least one trough portion of two trough portions of a ring-shaped metal gasket that has an S-shaped longitudinal cross section. The combination metal gasket does not demonstrate the plastic deformation even when a large compressive load is applied and is not likely to be destroyed even when a pressure of a fluid being sealed is high; that is, stable sealing properties are exhibited.

5 Claims, 4 Drawing Sheets

BACKGROUND ART

COMBINATION METAL GASKET AND SEAL STRUCTURE

BACKGROUND OF THE INVENTION

1. Field of the Invention

The present invention relates to a combination metal gasket and a seal structure that exhibit excellent durability without exhibiting the plastic deformation even under a high compressive load.

2. Description of the Related Art

So far, in the sealing of vacuum equipment and pressure fluid conduits, rubber gaskets, resin gaskets or metal gaskets typical in O-rings are in use. Among these, for positions that are exposed to a high temperature atmosphere and necessary to be elastically rebound, metal gaskets such as so-called C-shaped rings, S-shaped rings and E-shaped rings are in use.

The E-shaped ring is disclosed in, for instance, JP-A No. 2002-5290 that is patent literature 1. The gasket that has an E-shaped cross section has overcome a problem in that in a gasket that has a so-called C-shaped cross section shape, when the sealing properties are improved the displacement follow-up performance is deteriorated; on the contrary, when the displacement follow-up performance is improved, the sealing properties are deteriorated. That is, the E-shaped gasket, in addition to exhibiting an elastic rebound force (seal load) competing against the compressive load and thereby giving excellent sealing properties, moves elastically over a wide range to exhibit a stretching force in accordance with a variation of the compressive load, resulting in enabling to obtain excellent displacement follow-up performance.

Furthermore, in JP-A No. 08-145183 that is patent literature 2, a vacuum sealing gasket is disclosed, the vacuum sealing gasket being an elastic metal structure having a V-shaped or W-shaped longitudinal cross section on a sealing surface of which a rubber film having a thickness from 0.1 $\mu$m to 0.5 mm is combined, a rubber ring being fitted in a trough portion of the elastic metal structure. According to the vacuum sealing gasket, since the elastic metal structure follows-up a non-uniform seal gap in a seal portion and a thickness of the rubber film that is combined therewith and high in the shape restorability is made thin, a gas emission quantity is small even in a very high vacuum region and the repeating usage can be realized.

Patent literature 1; JP-A No. 2002-5290 (claim 1)

Patent literature 2; JP-A No. 08-145183 (claims 1 through 3)

However, the conventional S-shaped gasket and E-shaped gasket, as shown in FIG. 7, in the case of a large compressive load P that exceeds the elastic limits of their shapes being applied, stress is concentrated on backs 61, 61 of C-shaped cross-sectional portions to result in causing the plastic deformation. At this time, there is a problem in that since the elastic rebound force cannot be demonstrated, the sealing properties cannot be obtained. In FIG. 7, reference numerals 62 and 63 denote members being sealed. Furthermore, there is another problem in that when vibrations are applied repeatedly under a compressive load close to the elastic limit, the gasket undergoes the metal fatigue, resulting in a decrease in the durability due to the fatigue and destruction. Still furthermore, in the case of pressure difference between a side of a fluid being sealed and a side of a non-fluid opposite thereto being high, since the S-shaped or E-shaped ring gasket is usually low in the tightening load, a gap is generated at a sealing portion, resulting in causing the leakage. When simply a thickness of the S-shaped or E-shaped ring gasket is increased or a hard material is used, the tightening load can be increased; however, in this case, an elastic region is remarkably narrowed. Furthermore, in a gasket in which a rubber ring is combined like in JP-A NO. 08-145183, there is a problem in that the elastic metal structure cannot be yet sufficiently complemented in the elasticity, even more, cannot be used in high temperature regions.

Accordingly, an object of the present invention is to provide a metal gasket and a seal structure that do not demonstrate the plastic deformation even under a large compressive load, cause the destruction of the gasket with difficulty even when a pressure of a fluid being sealed is high, and thus exhibits stable sealing properties.

SUMMARY OF THE INVENTION

Under these circumstances, the present inventors studied hard and found that a combination metal gasket that is formed by fitting a ring-shaped metal base elastic structure in at least one trough portion of two or three trough portions of a ring-shaped metal gasket that has an S-shaped or E-shaped longitudinal cross section does not demonstrate the plastic deformation even when a large compressive load is applied, is not likely to cause the destruction of the gasket even when a pressure of a fluid being sealed is high, and thus exhibits stable sealing properties. Thus, the present invention came to completion.

That is, the present invention (1) provides a combination metal gasket that is obtained by fitting a ring-shaped metal base elastic structure in at least one trough portion of two trough portions of a ring-shaped metal gasket having an S-shaped longitudinal cross section. When such a configuration is adopted, even when a large compressive load is applied, the ring-shaped metal base elastic structure fitted in the trough portion works as a reinforcement material and thereby inhibits the ring-shaped metal gasket having an S-shaped longitudinal cross section from demonstrating the plastic deformation. Furthermore, even when a large compressive load such as exceeding the elastic limit is applied, similarly the ring-shaped metal base elastic structure inhibits the ring-shaped metal gasket having an S-shaped longitudinal cross section from demonstrating the deformation; accordingly, there is no worry of the seal leakage.

Furthermore, the present invention (2) provides a combination metal gasket that is obtained by fitting a ring-shaped metal base elastic structure in at least one trough portion of three trough portions of a metal gasket having a substantially E-shaped longitudinal cross section. When such a configuration is adopted, also in the metal gasket having the substantially E-shaped longitudinal cross section, an identical effect can be exhibited.

Still furthermore, the present invention (3) provides a seal structure in which the combination metal gasket is mounted between members being sealed. According to the seal structure according to the invention, even when a large compressive load is applied thereon or a pressure of a fluid being sealed being high, the stable sealing properties are exhibited; accordingly, equipment can be safely and stably operated.

BRIEF DESCRIPTION OF THE DRAWINGS

FIG. 1 is a partial sectional view showing a non-compression state when a combination metal gasket according to a first embodiment of the invention is fitted in.

FIG. 2 is a partial sectional view showing a compression state when a combination metal gasket according to a first embodiment of the invention is fitted in.

FIG. 3 is a partial sectional view showing a non-compression state when another combination metal gasket according to a first embodiment of the invention is fitted in.

FIG. 4 is a partial sectional view showing a compression state when another combination metal gasket according to a first embodiment of the invention is fitted in.

FIG. 5 is a partial sectional view showing a compression state when a combination metal gasket according to a second embodiment of the invention is fitted in.

FIG. 6 is a partial sectional view showing a compression state when another combination metal gasket according to a second embodiment of the invention is fitted in.

FIG. 7 is a partial sectional view showing a compression state when a conventional S-shaped metal gasket is fitted in.

DETAILED DESCRIPTION OF THE INVENTION

Figure 1:
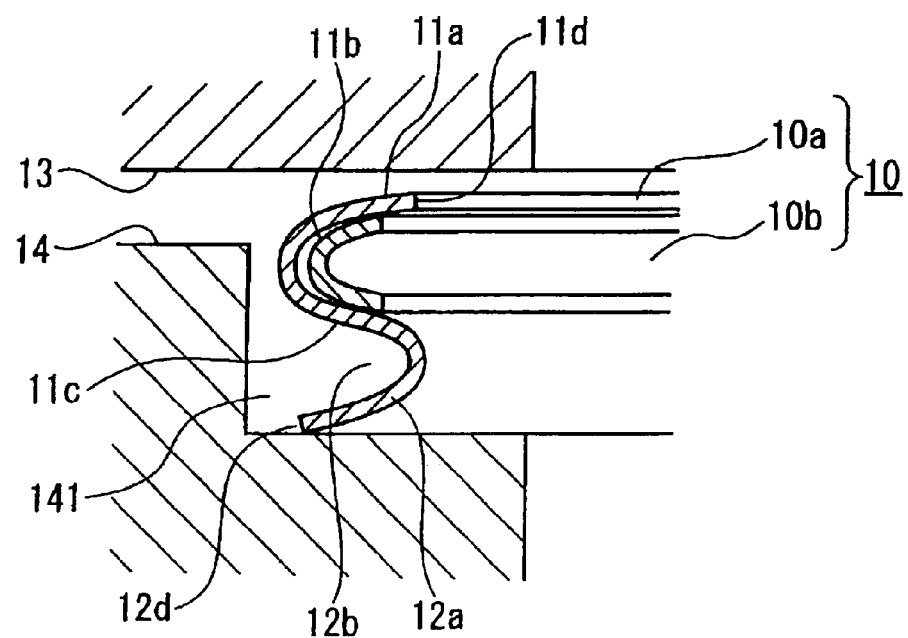

In the next place, a combination metal gasket according to a first embodiment of the invention will be explained with reference to FIGS. 1 and 2. FIG. 1 is a partial sectional view showing a non-compression state when a combination metal gasket according to the present embodiment is fitted in, and FIG. 2 is a partial sectional view showing a compression state when the combination metal gasket according to the embodiment is fitted in.

A combination metal gasket 10 according to the present embodiment includes a combination of a ring-shaped metal gasket having an S-shaped longitudinal cross section (hereinafter referred to also as an S-shaped metal gasket) 10a and a U-shaped metal ring (a ring-shaped metal base elastic structure) 10b. The S-shaped metal gasket 10a is a ring-shaped metallic one-piece body that is formed into a cross section shape in which a C-shaped cross sectional shape portion 11a and an inverse C-shaped cross sectional shape portion 12a continue at a linkage point 11c that is outside edges of both of the C shapes, and has two troughs of a trough 11b due to the C character shape on a side of fluid being sealed (right side in the drawing) and a trough 12b due to the inverse C character shape on a non-fluid side opposite thereto (left side in the drawing). The S-shape does not mean a strict shape and may be, other than the shapes in FIG. 1, one in which, for instance, the C character shape or the inverse C character shape, like a literal C shape, is formed into a curling shape that curls inwardly at outside edges 11d and 12d at the tip end thereof, or one in which a side member that comes into contact with a C-shaped or an inverse C-shaped member being sealed may form a flat portion shown in FIG. 2 from a time of non-compression.

Figure 2:
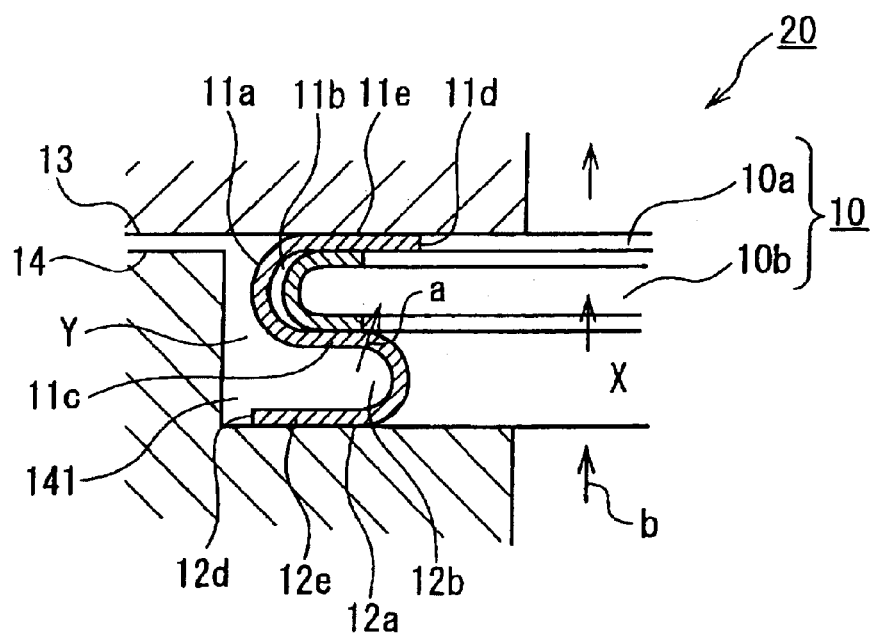

A U-shaped metal ring 10b is a ring-shaped metal product having a U-shaped cross section, and, in FIGS. 1 and 2, fitted in the trough portion 11b on a side of the fluid being sealed so that an opening thereof may be on a side of the fluid. As a dimension of a thickness of the U-shaped metal ring 10b, a magnitude to the extent that allows fitting manually in the tough portion 11b of the S-shaped metal gasket 10a that is in a non-compression state and comes into contact with in-plane side surfaces that face each other of the C-shaped trough is preferable. When the thickness of the U-shaped metal ring 10b is excessive, it cannot be fitted in the tough portion of the S-shaped metal gasket 10a, alternatively if it would be fitted in by forcibly expanding the opening, the follow-up performance would only result in deteriorating. Furthermore, when the thickness of the U-shaped metal ring 10b is too small, the S-shaped metal gasket 10a, when a large compressive load is applied thereon, cannot be inhibited from causing the plastic deformation.

In the present embodiment, as a mode according to which the U-shaped metal ring 10b is fitted in the trough portion of the S-shaped metal gasket 10a, other than the modes shown in FIGS. 1 and 2, a mode according to which one U-shaped metal ring is fitted in the tough portion 12b on a side of non-fluid of the S-shaped metal gasket 10a and a mode according to which two U-shaped metal rings, respectively, are fitted in two trough portions 11b and 12b can be cited. Among these, the mode according to which two U-shaped metal rings, respectively, are fitted in two trough portions 11b and 12b of the S-shaped metal gasket 10a is preferable because even when a large compressive load is applied, the S-shaped metal gasket 10a can be assuredly inhibited from causing the plastic deformation.

A method of manufacturing the S-shaped metal gasket 10a is not particularly restricted. A method in which, for instance, deep drawing, bending and press working are appropriately combined to cause the plastic deformation on a predetermined metal base material that corresponds to the object is applied. As the metal base material, for instance, stainless steel, nickel base alloys can be cited. Furthermore, the metal materials of the S-shaped metal gasket 10a and the U-shaped metal gasket 10b may be the same or different from each other. Still furthermore, surfaces of the S-shaped metal gasket 10a and the U-shaped metal gasket 10b may be plated with silver and so on.

Figure 7:
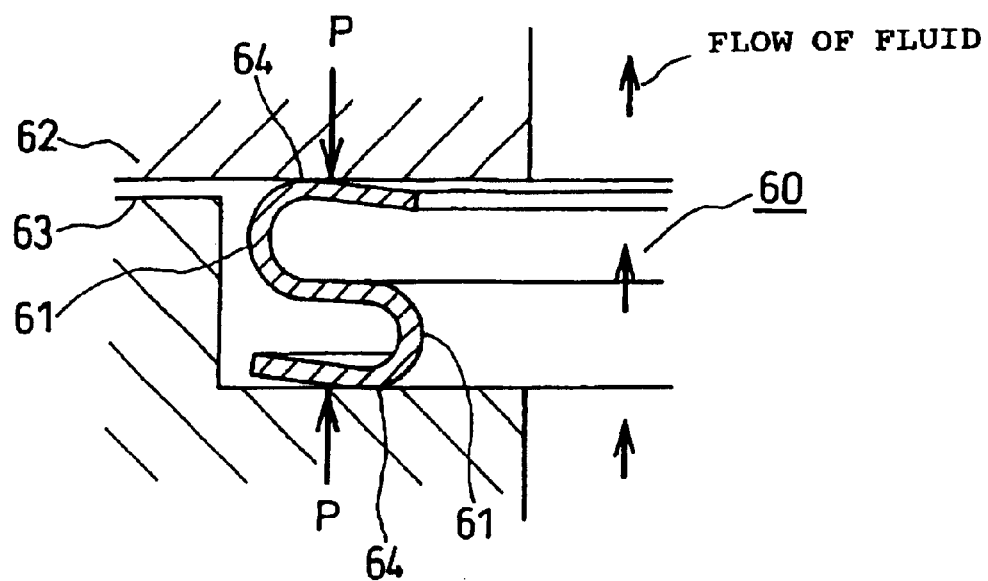

In the next place, how to use a combination metal gasket 10 will be explained. As to positions being used, the combination metal gasket 10 is fitted in a recess portion 141 of one member being sealed 14 as shown in, for instance, FIG. 1. In the next place, members being sealed 13 and 14 are fastened so as to make a gap between these narrower. The combination metal gasket 10 becomes a state clipped and fastened under a predetermined compressive load, and thus constitutes a seal structure 20 (FIG. 2). In the combination metal gasket 10 in the embodiment, in a state fastened by a predetermined compressive load, the S-shaped metal gasket 10a comes into surface contact with the member being sealed 13 in a flat portion 11e and the S-shaped metal gasket 10a comes into surface contact with the member being sealed 14 in a flat portion 12e. However, the contact, without restricting to the above, may be a line contact at points 64 as shown in, for instance, FIG. 7.

Figure 3:
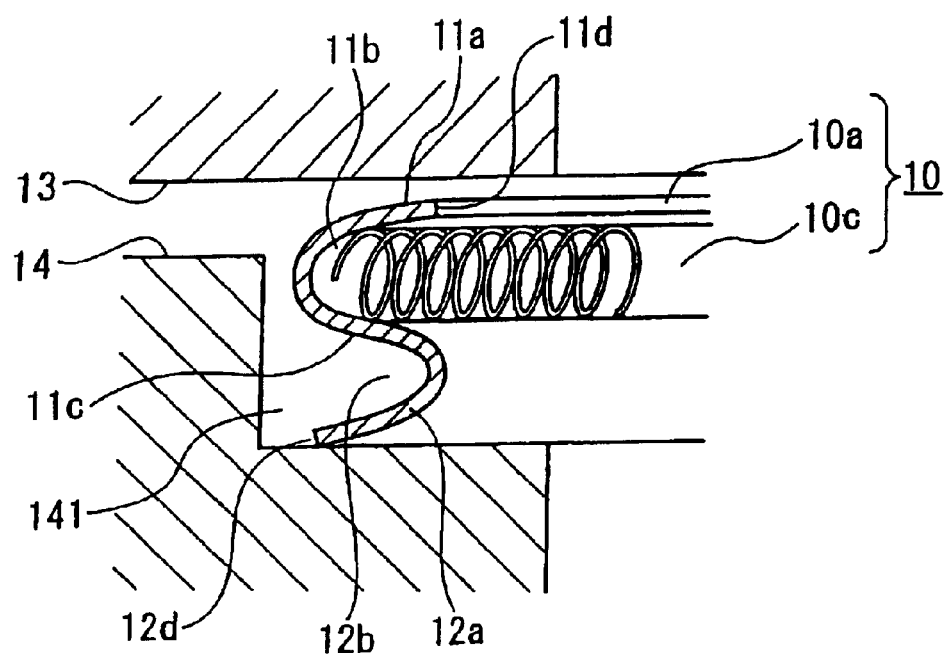
Figure 4:
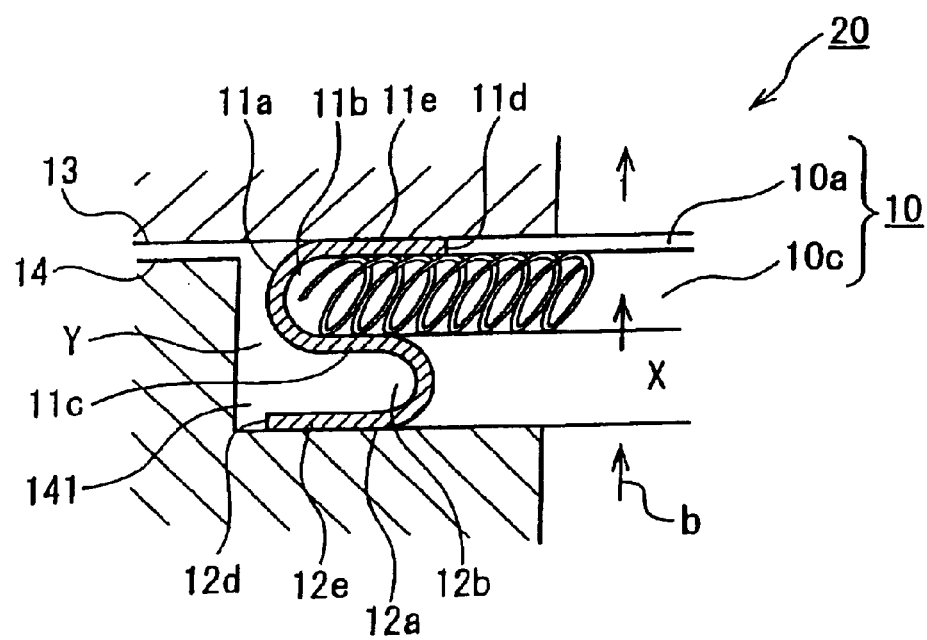

Furthermore, in the embodiment, as the ring-shaped metal base elastic structure, the U-shaped metal ring is used; however, without restricting to this, for instance, a V-shaped metal ring, a C-shaped metal ring and a spring ring can be used. As a direction in which the U-shaped metal ring, the V-shaped metal ring and the C-shaped metal ring are fitted in the trough portion of the metal gasket, without restricting to the above embodiment, these may be fitted in with the openings thereof directed toward the trough. As the spring ring, a coil spring in which for instance a diameter is a dimension that can be fitted in an inner diameter of the trough portion and a length is wound into a length of circumference after the fitting in is prepared, and this is fitted in the trough portion (FIG. 3). In a state where the coil spring 10c is used, the compressive load is applied in a direction of diameter different from a direction in which a general coil spring is energized; however, even in such a state used, the rebound can be exhibited (FIG. 4).

According to the combination metal gasket 10 according to the first embodiment, even when a large compressive load is applied, an energizing force against the compressive load of the ring-shaped metal base elastic structure fitted in the trough portion works so as to inhibit the ring-shaped metal gasket having an S-shaped longitudinal cross section from plastically deforming, and thereby the high sealing properties can be maintained. Furthermore, even when the vibration is repeatedly applied under the large compressive load, similarly, the ring-shaped metal base elastic structure inhibits the ring-shaped metal gasket having the S-shaped longitudinal cross section from deforming; accordingly, the seal leakage is not likely to be caused.

The seal structure 20 according to the first embodiment is preferably formed with at least one of the U-shaped metal ring 10b and the spring ring 10c fitted in the trough portion on a lower pressure side of a side X of a fluid being sealed and a side Y of a non-fluid on an opposite side thereof. For instance, in the case of a pressure $P_X$ on a side X of fluid being sealed and a pressure $P_Y$ on a side Y of non-fluid opposite to X are in relation of $P_X < P_Y$, the U-shaped metal ring 10b and the spring ring 10c are fitted in the trough portion 11b on a side X of fluid being sealed. Thereby, even when a gasket is made of a thin plate and the deformation due to pressure difference is generated in an arrow mark a direction in FIG. 2, since the U-shaped metal ring 10b or the spring ring 10c that is an elastic body is fitted in on a deformation side, high sealing properties can be maintained.

The seal structure 20 according to the first embodiment is applied to seal, for instance, vacuum devices and pressure fluid conduits. A fluid expressed by reference sign b in FIG. 2 may be any one of a gas and a liquid and is used in a temperature range of from −200 to 500 degree centigrade. In particular, in the case of under a high temperature condition such as a temperature on a side of fluid being in the range of from 200 to 500 degree centigrade, since the combination metal gasket 10 according to the present embodiment does not at all use a rubber member, it is preferable in that the effect of the invention can be assuredly demonstrated.

Figure 5:
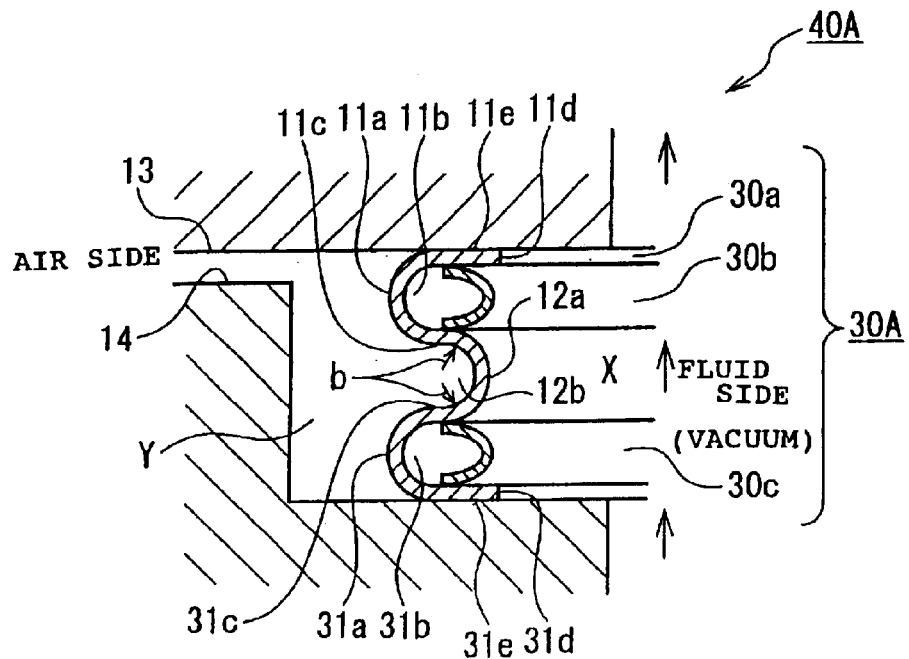
Figure 6:
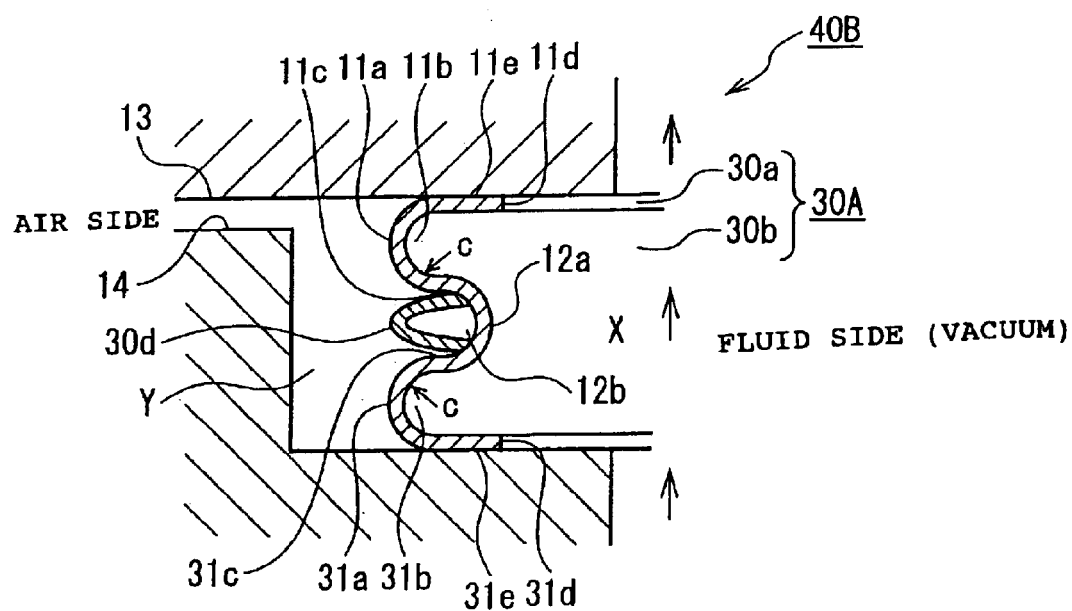

In the next place, a combination metal gasket 30A in a second embodiment according to the invention will be explained with reference to FIGS. 5 and 6. FIG. 5 is a partial sectional view showing a compression state when the combination metal gasket according to the embodiment is fitted in and FIG. 6 is a partial sectional view showing a compression state when another combination metal gasket according to the embodiment is fitted in. In FIGS. 5 and 6, the same constituent elements as that in FIG. 2 are given the same reference numerals, explanations thereof are omitted, and different points will be mainly explained. That is, in the combination metal gasket 30A according to the second embodiment, points different from the combination metal gasket 10 according to the first embodiment are in that the S-shaped metal gasket is replaced by a metal gasket having a substantially E-shaped longitudinal cross section (hereinafter also referred to as substantially E-shaped metal gasket) and the U-shaped metal gasket is replaced by a V-shaped metal gasket.

The combination metal gasket 30A according to the second embodiment combines a substantially E-shaped metal gasket 30a and a V-shaped metal ring 30b (30c). The substantially E-shaped metal gasket 30a is a ring-shaped metallic one-piece body that is formed into a cross sectional shape in which a first C-shaped sectional shape portion 11a and an inverse C-shaped sectional shape portion 12a are allowed continuing at a linkage point 11c that is outside edges of both of the C shapes, and the inverse C-shaped sectional shape portion 12a and a second C-shaped sectional shape portion 31a are allowed continuing at a linkage point 31c that is outside edges of both of the C shapes, the substantially E-shaped metal gasket 30a having three trough portions, that is, two trough portions 11b and 31b due to the C shapes on a side of fluid being sealed (right side in the drawing) and one trough portion 12b due to the inverse C shape on a side of non-fluid that is on an opposite side (left side in the drawing). The substantially E shape does not necessarily express a strict shape and, other than the shapes in FIG. 4, may be a curling shape in which like for instance the C shape or the inverse C shape that is a literal C, outside edges 11d and 31d at tip ends thereof bends inward. Furthermore, the first and second C-shaped sectional shape portions 11a and 31a and the inverse C-shaped sectional shape portion 12a may not necessarily be the same in the shape; that is, for instance, the inverse C-shaped sectional shape portion 12a may be a horizontal V shape that is obtained by rotating the V shape 90 degree counter clock wise.

In the combination metal gasket 30A according to the second embodiment, as a mode by which the V-shaped metal ring is fitted in the trough portion of the substantially E-shaped metal gasket 30a, a mode in which two V-shaped metal rings, respectively, are fitted in the trough portions 11b and 31b on a side X of fluid being sealed so that openings thereof may direct toward the trough portions (FIG. 5), a mode in which one V-shaped metal ring is fitted in the trough portion 12b on a non-fluid side Y so that an opening thereof may direct toward the trough portion (FIG. 6) and a mode in which three V-shaped metal rings are fitted in three trough portions 11b, 12b and 31b so that openings thereof may direct toward the trough portions can be cited. Among these, the mode in which three V-shaped metal rings are fitted in three trough portions 11b, 12b and 31b is preferable in that even when a large compressive load is applied, the substantially E-shaped metal gasket 10a can be assuredly inhibited from plastically deforming.

According to the combination metal gasket 30A according to the second embodiment, even when a large compressive load is applied, the V-shaped metal ring that is fitted in the trough portion works as an elastic rebound member, and thereby the ring-shaped metal gasket having a substantially E-shaped longitudinal cross section can be inhibited from plastically deforming. Furthermore, even when repeated vibrations are applied under a large compressive load, similarly, the V-shaped metal ring inhibits the ring-shaped metal gasket having a substantially E-shaped longitudinal cross section from deforming; accordingly, there is no likelihood of seal leakage of the gasket.

The seal structure according to the second embodiment is preferably formed with at least one V-shaped metal ring fitted in the trough portion on a lower pressure side of a side X of a fluid being sealed and a side Y of a non-fluid that is on an opposite side. For instance, like the sealing of a vacuum device such as shown in FIG. 5, in the case of a pressure $P_X$ on a side X of fluid being sealed and a pressure $P_Y$ on a side Y of non-fluid that is on an opposite side to X satisfying $P_X \leq P_Y$ the V-shaped metal rings 30b and 30c, respectively, are fitted in the trough portions 11b and 31b on a side X of fluid being sealed. Furthermore, like the sealing of a high-pressure conduit such as shown in FIG. 6, in the case of a pressure $P_X$ on a side X of fluid being sealed and a pressure $P_Y$ on a side Y of non-fluid that is on an opposite side to X satisfying $P_X \leq P_Y$, the V-shaped metal ring 30d is fitted in the trough portion 12b on a side Y of non-fluid. Thereby, even when a gasket is made of a thin plate and the deformation due to pressure difference is caused in an arrow mark b direction (FIG. 5) or in an arrow mark c direction (FIG. 6), since the V-shaped metal rings 30b and 30c (FIG. 5), or 30d that are the elastic rebound bodies are fitted in on deformation side, the plastic deformation is not caused, that is, the destruction is caused with difficulty. In the second embodiment, similarly, the V-shaped metal ring may be a U-shaped metal ring, a C-shaped metal ring or a spring ring. In the case of the U-shaped metal ring or the C-shaped metal ring, a direction being fitted in may be disposed so that an opening may be on an opposite side to the trough portion.

The seal structures 40A and 40B according to the second embodiment also may be applied to places similar to that in the seal structure 20 according to the first embodiment, and the use conditions and the effects are also similar thereto.

According to the present invention, even when a large compressive load is applied, an energizing force against the compressive load of the ring-shaped metal base elastic structure that is fitted in the trough portion works so as to inhibit the ring-shaped metal gasket having the S-shaped or E-shaped longitudinal cross section from plastically deforming. Furthermore, even when the vibration is repeatedly applied under a large compressive load, similarly, the ring-shaped metal base elastic structure inhibits the ring-shaped metal gasket having the S-shaped or E-shaped longitudinal cross section from deforming; accordingly, the seal leakage is not likely to be caused. Still furthermore, even when the pressure difference between a side of fluid being sealed and a non-fluid side opposite thereto is high, since the ring-shaped metal base elastic structure for reinforcement is fitted in on the deformation side, even a gasket that is made of a thin plate is not likely to be destroyed.

What is claimed is:

1. A combination metal gasket:
wherein the combination metal gasket is formed by fitting a ring-shaped metal base elastic structure in at least one trough portion of two trough portions of a ring-shaped metal gasket that has an S-shaped longitudinal cross section, and wherein the metal base elastic structure contacts only in-plane side surfaces of the trough portion,
wherein the ring-shaped metal base elastic structure is a ring structure that has a U-shaped or V-shaped longitudinal cross section.

2. A combination metal gasket:
wherein the combination metal gasket is formed by fitting a ring-shape metal base elastic structure in at least one trough portion of three trough portions of a metal gasket that has a substantially E-shaped longitudinal cross section, and wherein the metal base elastic structure contacts only in-plane side surfaces of the trough portion,
wherein the ring-shaped metal base elastic structure is a ring structure that has a U-shaped or V-shaped longitudinal cross section.

3. A seal assembly:
wherein the seal structure is formed by fitting a combination metal gasket set forth in claim 1 or 2 in between members being sealed.

4. A seal assembly as set forth in claim 3:
wherein the at least one ring-shaped metal base elastic structure is fitted in the trough portion on a lower pressure side of a side of fluid being sealed and a side of non-fluid that is on the opposite side thereof.

5. A seal assembly as set forth in claim 3:
wherein a temperature on a side of fluid is in the range of from 200 to 500 degree centigrade.

* * * * *